(12) United States Patent
Nizar et al.

(10) Patent No.: US 6,212,611 B1
(45) Date of Patent: Apr. 3, 2001

(54) METHOD AND APPARATUS FOR PROVIDING A PIPELINED MEMORY CONTROLLER

(75) Inventors: Puthiya K. Nizar, El Dorado Hills; Michael W. Williams, Citrus Heights, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/186,045

(22) Filed: Nov. 3, 1998

(51) Int. Cl.$^7$ .................................................. G06F 13/00
(52) U.S. Cl. ............................................. 711/169; 711/154
(58) Field of Search ..................................... 711/169, 154

(56) References Cited

U.S. PATENT DOCUMENTS

| | | | |
|---|---|---|---|
| 5,058,051 | 10/1991 | Brooks | 711/167 |
| 5,060,145 | 10/1991 | Scheuneman et al. | 711/169 |
| 5,222,223 | 6/1993 | Webb, Jr. et al. | 711/140 |
| 5,280,597 | 1/1994 | Takata et al. | 711/169 |
| 5,323,489 | 6/1994 | Bird | 711/167 |
| 5,379,379 | * 1/1995 | Becker et al. | 711/3 |
| 5,546,546 | 8/1996 | Bell et al. | 710/112 |
| 5,586,282 | 12/1996 | Iino et al. | 711/5 |
| 5,617,559 | 4/1997 | Le et al. | 711/169 |
| 5,619,730 | 4/1997 | Ando | 710/35 |
| 5,680,577 | 10/1997 | Aden et al. | 711/150 |
| 5,696,910 | 12/1997 | Pawlowski | 710/100 |
| 5,732,236 | 3/1998 | Nguyen et al. | 711/151 |
| 5,822,772 | 10/1998 | Chan et al. | 711/158 |
| 5,835,962 | 11/1998 | Chang et al. | 711/206 |
| 5,873,119 | 2/1999 | Khandekar et al. | 711/169 |
| 5,893,136 | 4/1999 | Stolt et al. | 711/105 |
| 5,903,916 | 5/1999 | Pawlowski et al. | 711/167 |
| 5,920,898 | 7/1999 | Bolyn et al. | 711/167 |
| 5,940,848 | 8/1999 | Bains | 711/1 |
| 5,983,325 | * 11/1999 | Lewchuk | 711/137 |
| 6,052,756 | * 4/2000 | Barnaby et al. | 711/169 X |

OTHER PUBLICATIONS

IBM Technical Disclosure Bulletin, "Central Processing Unit Lookahead Logic for Video Memory", vol. 36, Issue 6B, pp. 45–46, Jun. 1, 1999.

* cited by examiner

Primary Examiner—David L. Robertson
(74) Attorney, Agent, or Firm—Blakely, Sokoloff, Taylor & Zafman LLP

(57) ABSTRACT

A pipelined memory controller that includes a decode stage, and a schedule stage, wherein the schedule stage includes a command queue to store multiple commands. In one embodiment, the schedule stage further includes look ahead logic which can modify an order memory commands are stored in the command queue.

23 Claims, 5 Drawing Sheets

METHOD AND APPARATUS FOR PROVIDING A PIPELINED MEMORY CONTROLLER

FIELD OF INVENTION

The present invention relates to the field of computer systems, and, in particular, the field of processing memory access requests.

BACKGROUND OF THE INVENTION

A computer system's performance is in part dependent on the speed of accessing the system memory (e.g., the main general-purpose storage region of the computer system.) For example, microprocessors may only execute instructions as fast as the data operands are provided to the microprocessor. Many of the data operands need to be obtained from the system memory.

Therefore, the speed of accessing the system memory has a large impact on the speed at which a microprocessor is able to complete execution of instructions. As a result, there is a continuous need to increase the speed of accessing system memory.

Access to the system memory is commonly controlled by a unit referred to as the memory controller. The memory controller receives memory access requests (e.g., request to read data stored in memory or request to write data to memory) from other units within the computer system (e.g., the Central Processing Unit (CPU), Graphics accelerator, etc.) The memory controller arbitrates the order in which multiple requests will be granted access to memory. Moreover, the memory controller also prepares/translates memory access requests to be transferred to the system memory. For example, the memory controller may decode a memory request into one or more commands (depending upon the protocol of the memory) to be executed by the system memory in order to complete the memory request.

The rate at which the memory controller processes the memory requests is in part dependent on the bandwidth (i.e., rate of transmitting data) of the memory bus (i.e., an electronic pathway) between the memory controller and the system memory. For example, the memory controller typically may only submit requests to the system memory at a rate equal to or less than the rate of transmitting the data/controls on the memory bus. Otherwise, the memory requests will be prepared by the memory controller faster than they can be transmitted and a bottle neck effect will be the result.

In the past, the bandwidth of the memory bus has been relatively slow. As a result, memory controllers have been able to process memory request in a serial fashion (i.e., completing one memory request before beginning to process a subsequent memory request). Never the less, memory controllers were still able to fill most of the bandwidth of the memory bus, despite processing the requests in a serial fashion.

Advancements in the technology of the memory bus, however, have increased the bandwidth of transmitting data/controls on the memory bus. As a result, there is a need to increase the speed of the memory controller to process memory requests in order to take advantage of the increased bandwidth.

SUMMARY OF THE INVENTION

The present invention provides a pipelined memory controller that includes a decode stage, and a scheduling stage, wherein the scheduling stage includes a command queue to store multiple commands. In one embodiment, the scheduling stage further includes look ahead logic which can modify an order memory commands are stored in the command queue.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for providing a high performance memory controller is described. In one embodiment, the memory controller executes memory requests in a pipelined architecture having multiple stages. As a result, multiple requests are executed in parallel, which increases the throughput (i.e., speed and efficiency) of processing memory requests.

In addition, in one embodiment, the pipelined memory controller includes a scheduling stage having one or more command queues to store multiple memory commands that are to be transmitted to system memory. In one embodiment, the scheduling stage also includes Look Ahead Logic that compares memory commands presently stored in the command queue with a new memory commands that are to be stored in the queue. Based on the results the compare, the Look Ahead Logic schedules the new memory commands into selected slots of the command queue which will avoid memory conflicts and timing or rule violations and/or expedite execution of the memory commands.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
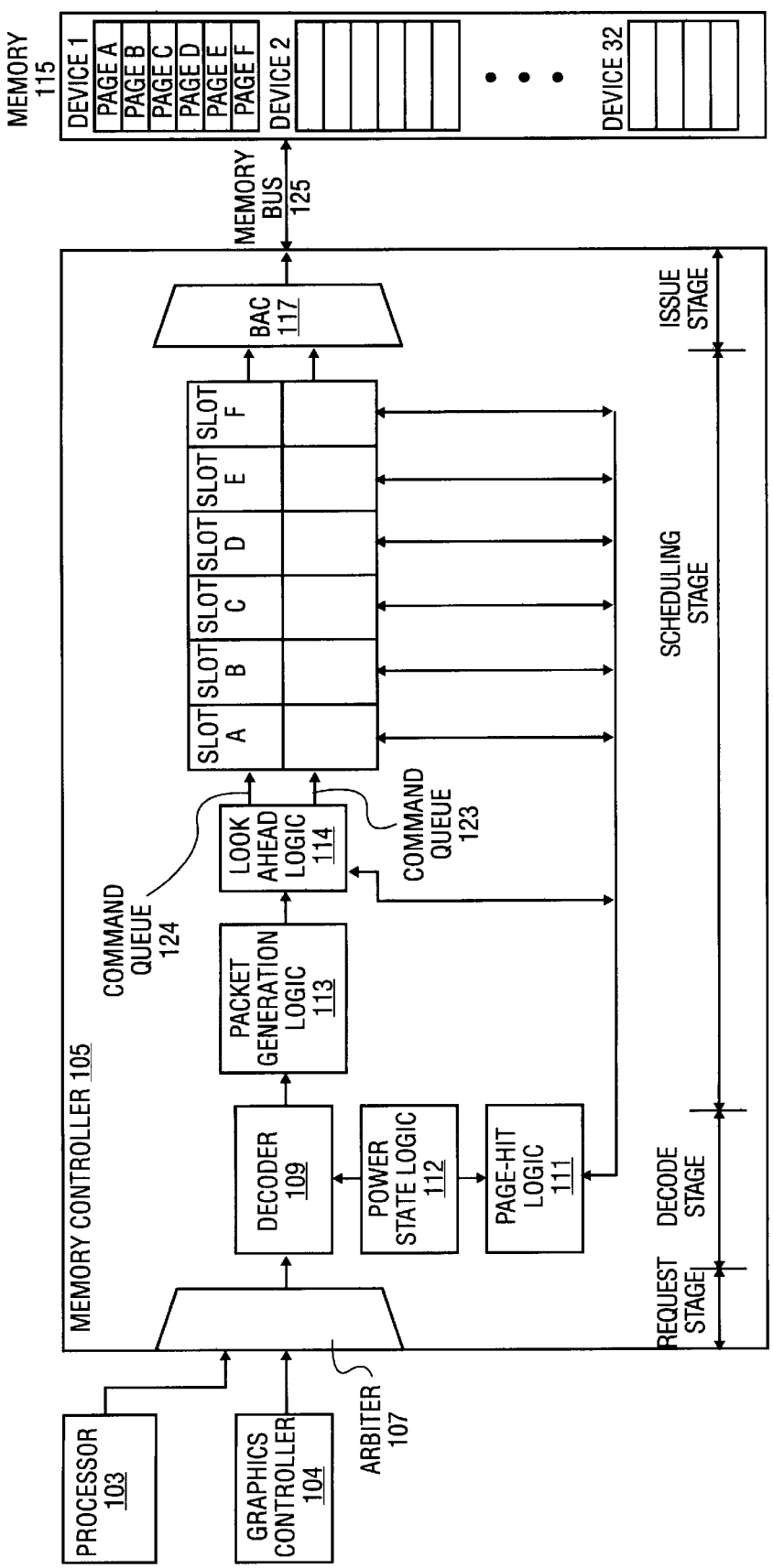
FIG. 1 is a block diagram of a computer system implementing a memory controller according to one embodiment.
Figure 2:
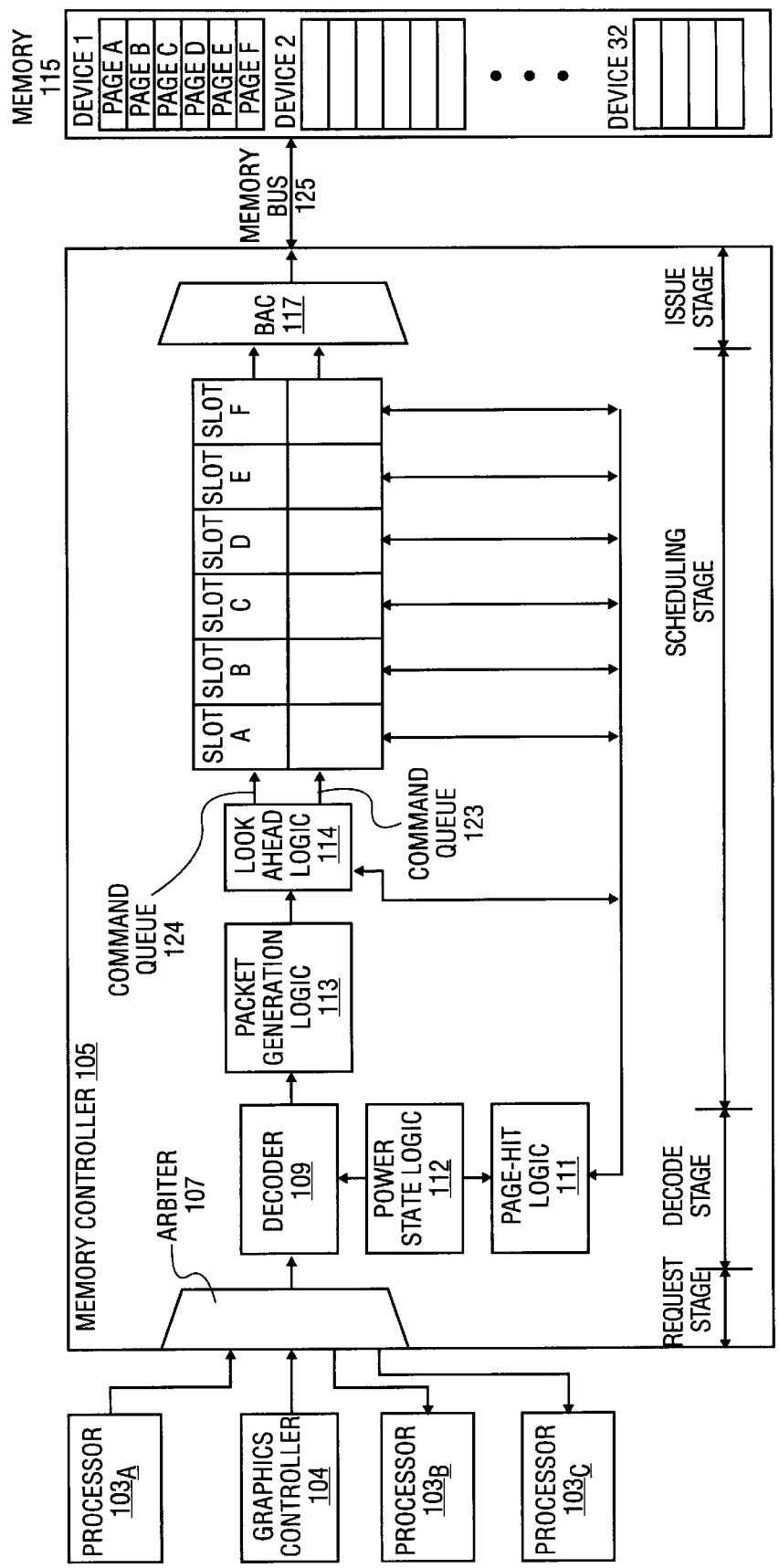
FIG. 2 is a block diagram of a computer system having multiple processors implementing a memory controller according to one embodiment.

FIG. 1 is block diagram of a computer system 101 implementing a memory controller 105 according to one embodiment. As illustrated, the memory controller 105 executes memory requests received from other components within the computer system. For example, the memory controller 105 will execute memory requests received from the processor 103 and/or a graphics controller 104. The memory controller 105 is also able to execute memory request received from additional peripherals connected to computer system, such as a disk drive, keyboard, and other discrete components within the computer system. Moreover, in alternative embodiments, the memory controller 105 may be provided in a computer system having multiple processors, as is shown in the block diagram of FIG. 2.

As illustrated in FIG. 1, the memory controller 105 of one embodiment executes memory requests in a pipelined architecture. For example, in one embodiment the memory controller 105 includes four stages: a request stage, a decode stage, a scheduling stage, and an issue stage. Each of the stages, as shown in FIG. 1, are completed in one clock cycle. In alternative embodiments, however, more or less stages may be included in the memory controller 105 without departing from the scope of the invention. In addition, the stages may require more or less than one clock cycle to complete.

Figure 3:
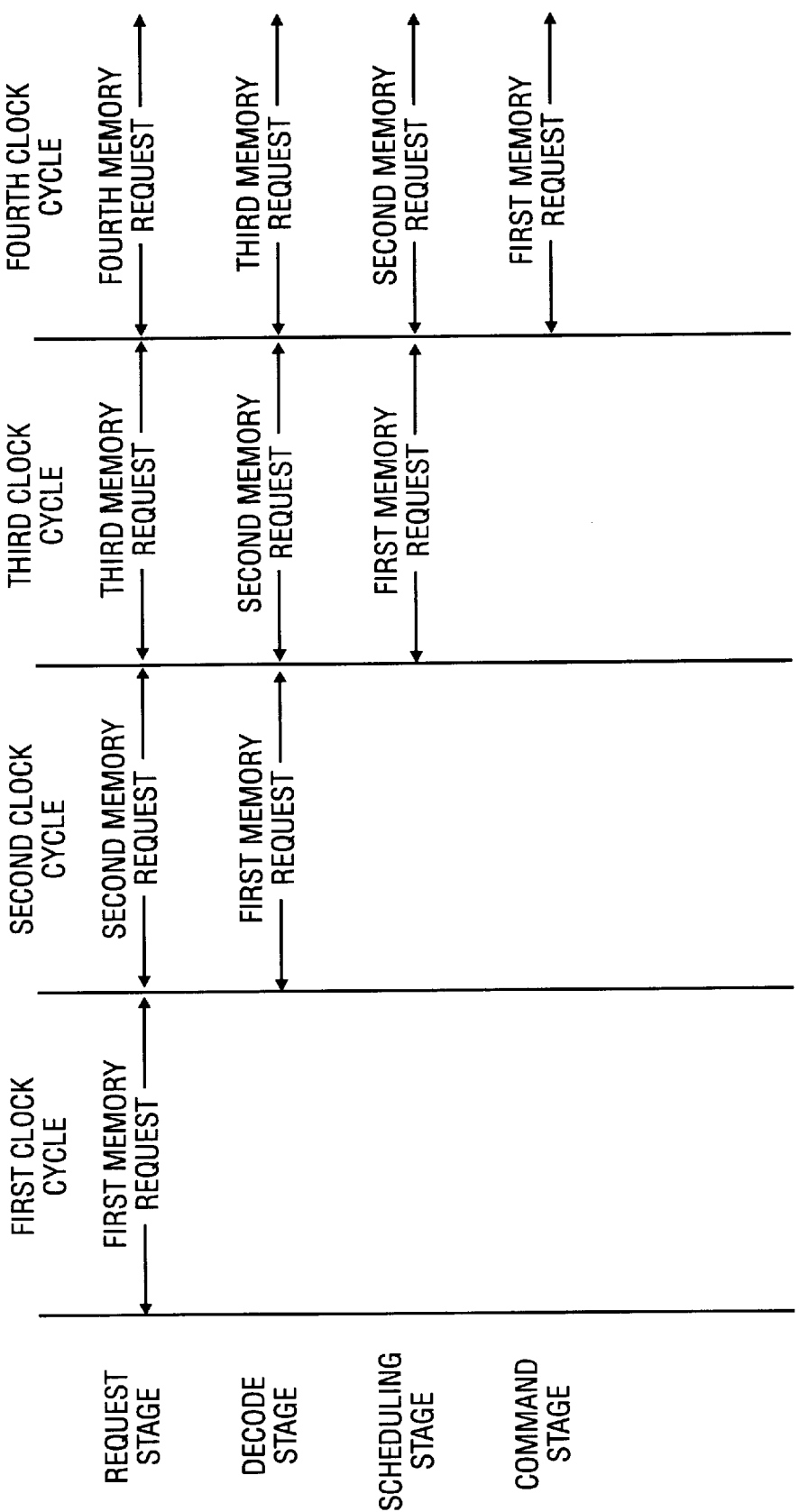
FIG. 3 illustrates a timing diagram illustrating a pipelined operation.
Figure 4:
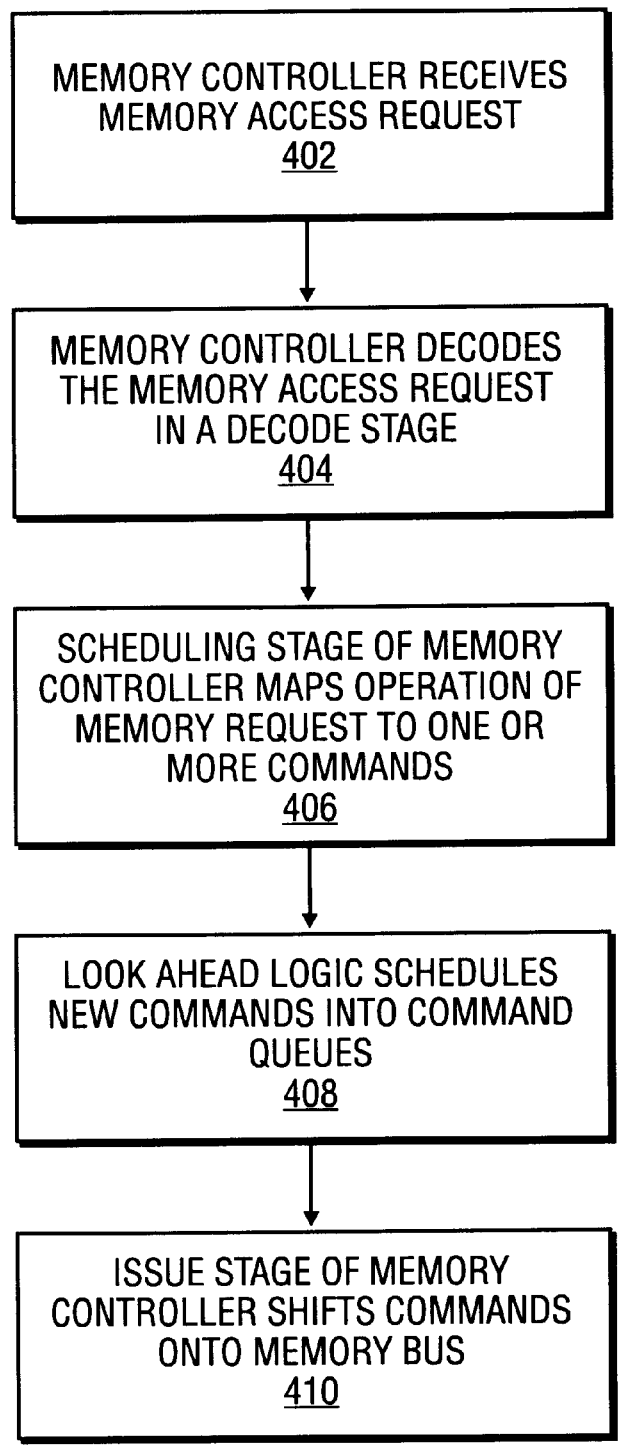
FIG. 4 is a flow diagram describing the steps of operating a memory controller according to one embodiment.

As previously discussed, the pipelined architecture permits multiple instructions to be executed in parallel, albeit, at separate stages within the memory controller 105. For example, as shown in FIG. 3, in a first clock cycle the request stage may receive a first request. In a second clock cycle, the first request is executed at the decoding stage, and a second request is executed at the request stage. In a third clock cycle, the first request is executed at the scheduling stage, the second request is executed at the decoding stage, and a third request is executed at the request stage, etc. As a result of executing the multiple instructions in parallel, the memory controller 105 is able to complete processing a memory request each clock cycle.

The steps of operating one embodiment of the memory controller 105 illustrated in FIG. 1 are described in the flow diagram of FIG. 3. In step 402, the memory controller 105 receives one or more requests from components within the computer system. In one embodiment, the requests are received at the arbiter of the memory controller 105. In the case of more than one memory request being received by the memory controller 105 simultaneously, the arbiter serves to determine the order in which memory requests will be processed by the memory controller 105. In one embodiment, the arbiter implements a predetermined order of priority.

For example, the graphics controller 104 may have first priority and the processor 103 second priority. As a result, if memory requests are received simultaneously from the processor 103 and the graphics controller 104, the memory request of the graphics controller would be processed prior to the request of the processor. In alternative embodiments, however, additional techniques to determine the order of processing multiple memory requests may be implemented without departing from the scope of the present invention.

In step 404, a decoding stage of the memory controller 105 decodes the memory requests. For example, in one embodiment, the decoding stage decodes a request to determine the intended operation of the request (e.g., read data or write data), and the memory address of the request. Thereafter, the memory address information is passed to subsequent stages of the memory controller 105 along with the operation of the decoded memory request.

The address information provided with the memory request is in part dependent on the type of memory implemented in the system. For example, in one embodiment as shown in FIG. 1, the system memory 115 consists of multiple addressable memory devices, each having multiple addressable memory pages. The memory pages include multiple memory storage locations (e.g., rows and columns.) Therefore, the decoded memory request may provide address information including a memory device ID, a memory page, and specify the row and column of the memory address.

However, in one embodiment, only one page of memory per memory device may be opened. As a result, in one embodiment, the decode stage determines if the memory page addressed by the respective memory request is already opened (i.e., determine if there is a page hit.) For example, the memory page of a memory device addressed by the presently decoded memory request may have already been opened by a command of an earlier memory request, and/or may about to be opened by a command stored in one of the command queues.

More specifically, in one embodiment, the decoding stage includes Page-hit logic 111, which identifies the pages of memory that are currently opened. As a result, the decoding stage compares the page addressed by the currently decoded memory request to the pages identified as presently being opened, and/or alternatively about to be opened by a command already in the command queue. The results of the comparison are forwarded to next stage of the memory controller 105, which is then used to determine which commands are necessary to complete the memory request.

For example, a page of a memory device that is to be accessed by the presently decoded memory request may already be scheduled to be opened by a page open command of a prior memory request, which is stored in the command queue. As a result, an open page command is not necessary for the presently decoded memory request. On the other hand, if the memory page is not scheduled to be open, a page open command for the presently decoded memory request would be necessary. In alternative embodiments, however, the step of determining if a page of memory is open may be performed in later stages of the memory controller 105 without departing from the scope of the present invention.

In addition, in an alternative embodiment the decode stage also determines the power state of the memory device addressed by the decoded memory request. For example, in one embodiment the memory devices within memory 115 have multiple power states (e.g., active, standby or sleep state.) In alternative embodiments, the power states may vary within the scope of the invention.

In one embodiment, a copy of the power state(s) for one or more of the memory devices is stored in the power state logic 112 within the decoding stage. Based on the memory address from the decoded memory request, the power state logic 112 provides the power state for the respective memory device. Thereafter, the related power state information is forwarded to subsequent stages in the memory controller 105.

Following the decode stage, in step 406, the scheduling stage of the memory controller 105 receives the operation, address information for the decoded memory request and page hit information as generated at the decode stage. In an alternative embodiment, power state information for the addressed memory device may also be received by the scheduling stage.

In response, the scheduling stage maps the operation of the decoded memory request (along with the page-hit and/or power-state information) to one or more commands. The commands (e.g., open page, close page, write data, read data, etc.), thereafter, are transmitted to memory to perform the memory access request.

In one embodiment, the packet generation logic 113 of the scheduling stage generates multiple commands simultaneously for a single operation of the decoded memory request. For example, in the case of an addressed memory page being closed (i.e., a page miss), the scheduling stage will provide commands to close an open page within the addressed memory device, a command to open the addressed page, and a command to read the address data. The group of commands, which map to the operation of the decoded memory request are sometimes referred to herein as a packet.

In one embodiment, the operation, page-hit and/or power-state information received from the decode stage is used to map into a micro-code table within the packet generation logic 113 to obtain the respective commands. In alternative embodiments, alternative techniques may be used by the packet generation logic to provide the commands to perform the operations of the decoded memory request.

The number and type of commands provided by the packet generation logic 113 of the scheduling stage is dependent on the type of memory device(s) implemented in the computer system. For instance, in one embodiment, a Direct Rambus™ memory subsystem is implemented as the memory of the computer system.

In one embodiment, the features of Direct Rambus™ include an operating frequency of 800 MHz, at a voltage of $2.5/1.8$ v. The memory bus connecting the memory controller 105 to memory 115 (otherwise referred to as the Rambus Channel™), transmits data at the rate of 1.6 Gbytes/Second, and has a data path of 16 bits per data channel. In addition, the Rambus Channel™ includes multiple command channels, which allow multiple commands to be transmitted from the memory controller 105 to memory 115 in parallel. Alternative memory busses/channels may also provide multiple command channels.

Moreover, alternative memory subsystems could be used with the memory controller 105 without departing from the scope of the invention. Furthermore, in an embodiment implementing Direct Rambus™, the features of Direct Rambus™ may also vary without departing from the scope of the invention.

After the scheduling stage has mapped the operation of the decoded memory request to one or more commands, the commands are scheduled into one or more command queues before being transmitted to memory. The scheduling stage of the memory controller 105 includes at least one command queue having multiple slots to store multiple commands, which are transmitted to memory to complete the memory request.

In an alternative embodiment implementing a memory bus having multiple command channels, multiple command queues (e.g., command queue 121 and command queue 123) corresponding to the command channels may be used, as shown in FIG. 1. Moreover, in the case of Direct Rambus™, at least two queues are provided in the packet and schedule stage of the memory controller 105: Primary Control Packet Queue (PCP); and the Secondary Control Packet Queue (SCP).

In one embodiment, it is predetermined into which queue a command will be placed. For example, in the case of Direct Rambus™, commands, such as page open, page close and/or change power state of an addressed memory device, will be placed into the PCP queue. In addition, the SCP queue will include such commands as memory read and memory write.

As will be described in more detail below, in one embodiment the commands within the command queue(s) are shifted each memory controller 105 clock cycle. As a result, one or more commands (depending upon the number of queues) are shifted onto the memory bus each clock cycle (unless a slot within a queue has no command.) In one embodiment, a null packet will be transmitted if they're no command in a slot of a queue.

Before scheduling the commands into the command queue(s), in step 408 Look ahead logic 114 included in the scheduling stage compares the commands that are to be stored in the command queues with the commands already stored in the command queues. Based on the comparison, the Look ahead logic 114 may detect potential memory timing or rule violations. In order to avoid the potential timing or rule violations, the Look ahead logic 114 may store the commands of the decoded memory request in the command queues in a modified order that will avoid the potential timing or rule violation.

For example, certain memory operations (e.g., reading/writing data) require a predetermined number of memory clock cycles to complete the operation (which may vary depending on the type of memory). As a result, multiple memory operations addressing the same memory device, page, and/or address may need to be separated by one or more clock cycles. The actual timing restrictions between two or more operations, however, may vary based on the type of operations (e.g., a read followed by a read, a read followed by a write, a write followed by a read, etc.)

In one embodiment, the Look ahead logic 114 compares the address information (e.g., memory device ID's, memory pages and/or row and address columns) of a memory command(s) to be scheduled with the commands already present in the command queues. In response to detecting a match (based on a predetermined "address" criterion—which may vary with in the scope of the invention), the logic may proceed to compare the "operations" of the commands which have matching address information.

The operations of the memory commands (having matching address information based on the predetermined address criterion) may then be compared against multiple different "operation" criterions (read vs. read, write vs. read, close page vs. read, close page vs. open page, etc.) The operation criterion used can vary within the scope of the invention. A match between the memory commands and one of the "operation" criterions may identify a potential timing or rule violation between two or more memory commands having matching memory address information (i.e., the two respective memory operations are to be separated by a predetermined number of clock cycles.)

The results of comparing the operations (i.e., the timing restriction information) are then used by the Look ahead logic 114 to determine when or where a command is to be inserted in the command queue(s) in order to avoid timing or rule violations. For example, in order to avoid a timing or rule violation, the scheduling logic may latch a memory command (i.e., delay the command) before inserting it into a command queue. As a result, the commands with matching address information and timing constraints may be separated by additional clock cycles to avoid the timing or rule violation.

In an alternative embodiment, the Look ahead logic 114 of the scheduling stage may latch commands already stored in slots of the command queue(s). As a result, a new command may be inserted ahead of the latched command(s) already stored in the queue(s).

In addition, the Look ahead logic 114 of the scheduling stage may also modify the order of commands already stored in the queues in order to expedite execution of a command(s) that are to be scheduled. For example, if a new memory operation addresses a page of memory that is being opened by a memory operation already stored in the command queue, the Look ahead logic 114 of the scheduling stage may nullify a page close operation already stored in the queue. As a result, the new command can be executed without having to open the page of memory. Alternatively, the Look ahead logic 114 could latch the page close command already stored in the queue, and insert the new command ahead of the latched page close command.

Following the scheduling stage, in step 410, the commands are shifted from the command queues onto the memory bus in the issue stage. In one embodiment of the invention, the command(s) stored in the end slot of a command queue(s) are shifted on to a corresponding command channel of the memory bus each clock cycle of the memory controller 105. The commands stored in the remaining slots are shifted to the adjacent slots, except in the case of the Look ahead logic 114 altering the order of the commands within the queues, as previously discussed.

In an alternative embodiment implementing multiple command queues, a predetermined time offset between the queues is used to separate commands stored in corresponding slots of the queues. For instance, commands in both end slots of the command queues may be simultaneously shifted into a bus access unit (BAC), which provides multiplexing/demultiplexing access to the memory bus. However, the BAC may latch the commands received from one of the queues for a predetermined fraction of a memory clock cycle, prior to placing the respective command onto the memory bus. For instance, in one embodiment, wherein the memory bus is operating at a frequency that is a multiple of the memory controller 105 (e.g., 800 Mhz, 400 MHz, or 100 Mhz), the commands from a command queue may be latched for one or more clock cycles of the memory bus.

In addition, in an embodiment implementing a predetermined offset between the queues, the Look ahead logic 114 is aware of the offset provided between the command queues. As a result, the Look ahead logic 114 takes the offset into account when determining when and where a command should be inserted into queue in order to avoid timing or rule violations, as previously discussed.

In a second alternative embodiment, a dynamic (i.e., changing) offset between the queues may be provided. More specifically, the Look ahead logic 114 inserts offset information into a queue slot along with a memory command. As a result, when the command and the offset timing information is shifted from the end slot of a queue, the BAC may use the timing information to latch the respective command in accordance with the timing information.

The Look ahead logic 114 may generate the offset timing information during the scheduling stage when determining if timing constraints/restrictions are present as previously discussed. The Look ahead logic 114 could insert the offset timing information into the slots of the queues along with the commands in order to avoid timing constraints/restrictions.

Moreover, considering the flexibility of the Look ahead logic 114 dynamically generating the offset timing information (i.e., inserting offsets of varying lengths), the tasks of selecting when and which queue slots to insert a command, is further simplified. For example, there may be an instances where the Look ahead logic 114 could insert offset timing information to avoid timing constraints/restrictions, rather manipulating the order of commands which are already stored in the queues.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

Figure 5:
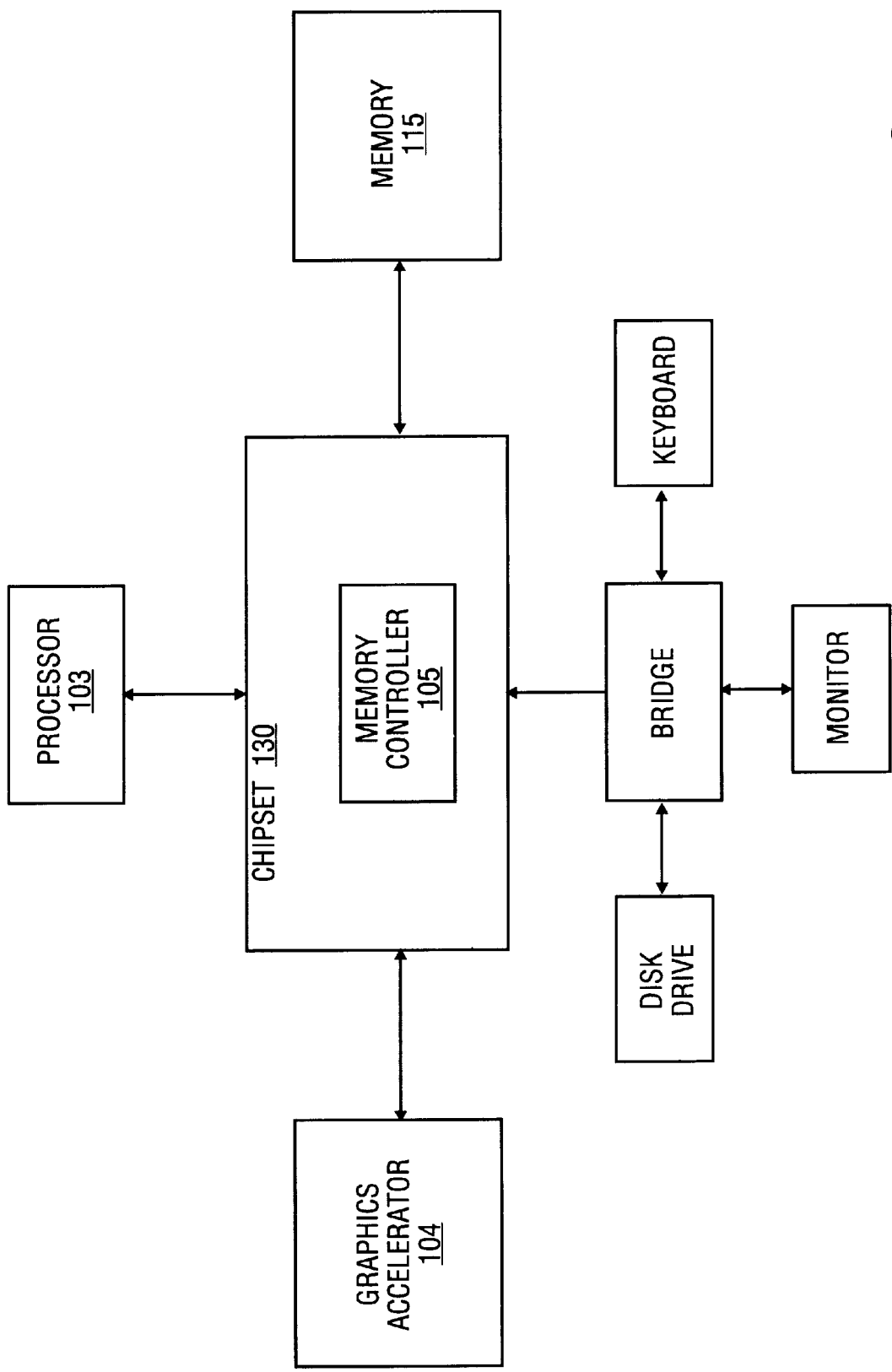
FIG. 5 is a block diagram of a computer system implementing a memory controller in a chipset according to one embodiment.

For instance, in one embodiment, the memory controller 105, as previously described throughout the detailed description, is implemented on a set of chips (i.e., chipset 130) that provide(s) an interface between the computer system's subsystems and/or multiple components. For example, as shown in the block diagram of FIG. 5, the chipset 130 provides the buses and electronics to allow a processor 103, memory 115 and input/output devices to interact. Furthermore, in an additional alternative embodiments, the memory controller 105 implemented on the chipset 130 as shown in FIG. 5, could also have additional components integrated on the chipset 130 (e.g., a processor 130, graphics accelerator 104.)

What is claimed is:

1. A pipelined memory controller comprising:
   a decode stage; and
   a scheduling stage coupled to said decode stage, said scheduling stage including a command queue to store multiple commands and Look Ahead Logic that modifies an order memory commands are stored in said command queue.

2. The memory controller of claim 1, wherein said scheduling stage further includes Look Ahead Logic.

3. The memory controller of claim 2, wherein said Look Ahead Logic modifies an order memory commands are stored in said command queue.

4. The memory controller of claim 3, wherein said scheduling stage includes at least two command queues.

5. The memory controller of claim 4, wherein said memory controller is operable to be coupled to a memory bus having two command channels.

6. The memory controller of claim 2, wherein commands stored in said command queue are dynamically delayed prior to being transmitted on to a memory bus.

7. The memory controller of claim 6, wherein commands stored in said command queue include timing information provided by said scheduling stage to implement said dynamic delay.

8. The memory controller of claim 3, wherein commands stored in said command queues are transmitted on to a memory bus at a fixed predetermined rate.

9. The memory controller of claim 8, wherein commands stored in the two separate command queues are separately transmitted on to the memory bus at a fixed offset.

10. The memory controller of claim 5, wherein the memory bus is a Rambus Channel™.

11. The memory controller of claim 5, wherein said memory controller is implemented on a chipset.

12. A pipelined memory controller comprising:
    means for decoding a memory request; and
    means for scheduling multiple memory commands into a command queue for storing multiple memory commands, said means for scheduling multiple memory commands includes Look Ahead Logic that includes means for modifying an order memory commands are stored in said command queue.

13. The memory controller of claim 12, wherein said means for scheduling multiple memory commands includes Look Ahead Logic.

14. The memory controller of claim 12, wherein said look ahead logic include means for modifying an order memory commands are stored in said command queue.

15. The memory controller of claim 14, wherein said means for scheduling multiple memory commands further includes at least two command queues.

16. The memory controller of claim 15, wherein said memory controller includes means for coupling the memory controller to a memory bus having two command channels.

17. The memory controller of claim 13, wherein said memory controller further includes means for dynamically delaying memory commands stored in said command queue prior to transmitting said memory commands on to a memory bus.

18. The memory controller of claim 17, wherein commands stored in said command queue included timing information provided by said means for scheduling.

19. The memory controller of claim 16, wherein said memory controller further includes means for transmitting said memory commands on to a memory bus at a fixed predetermined rate.

20. The memory controller of claim 16, wherein said memory controller further includes means for transmitting commands stored in the two separate command queues on to the memory bus at a fixed offset.

21. The memory controller of claim 16, wherein the memory bus is a Rambus Channel™.

22. The memory controller of claim 14, wherein said memory controller is implemented on a chipset.

23. A pipelined memory controller comprising:
   a decode stage; and
   a scheduling stage coupled to said decode stage, said scheduling stage including two command queues to store multiple commands, and look ahead logic to modify an order commands are stored in said command queues.

* * * * *